(12) United States Patent
Daoud et al.

(10) Patent No.: US 6,226,436 B1
(45) Date of Patent: May 1, 2001

(54) FIBER OPTICAL PEDESTAL

(75) Inventors: Bassel Hage Daoud, Parsippany; Christopher M. Helmstetter, Bridgewater; Jason A. Kay, Morristown; David S. Kerr, Morris Plains, all of NJ (US); Ivan Pawlenko, Holland, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/442,532

(22) Filed: Nov. 18, 1999

(51) Int. Cl.[7] ...................................................... G02B 6/00
(52) U.S. Cl. ............................................. 385/135; 385/134
(58) Field of Search ..................................... 385/134, 135

(56) References Cited

U.S. PATENT DOCUMENTS

| | | | |
|---|---|---|---|
| 4,913,522 | 4/1990 | Nolf et al. ........................... | 350/96.2 |
| 5,069,516 | 12/1991 | Kohy et al. .......................... | 350/96.1 |
| 5,155,794 | 10/1992 | Nolf et al. ........................... | 385/135 |
| 5,249,253 | 9/1993 | Franckx et al. ....................... | 385/135 |
| 5,323,480 * | 6/1994 | Mullaney et al. ..................... | 385/135 |
| 5,396,575 | 3/1995 | Hayward et al. ..................... | 385/135 |
| 5,602,954 | 2/1997 | Nolf et al. ........................... | 385/135 |
| 5,884,002 * | 3/1999 | Cloud et al. ......................... | 385/135 |
| 5,911,027 * | 6/1999 | Macken et al. ....................... | 385/135 |

* cited by examiner

Primary Examiner—Cassandra Spyrou
Assistant Examiner—Euncha Cherry
(74) Attorney, Agent, or Firm—Duane Morris & Heckscher LLP; Steven E. Koffs

(57) ABSTRACT

A system for organizing optical fibers includes a pedestal, a bracket and a fiber splice tray. The pedestal has a longitudinal passage through it. The pedestal has at least one hole on its side surface. The hole penetrates from the longitudinal passage to an exterior of the pedestal. The bracket is mounted to the pedestal near the hole. The bracket is capable of receiving and storing a plurality of fiber splice trays. Preferably, the pedestal includes a plurality of holes located around its perimeter and a plurality of brackets located between respective ones of the plurality of holes. Each tray is movable between a vertical position for storage and a horizontal position for accessing a fiber on the tray. The assembly has a single base mounted on the pedestal below the plurality of holes, at a distance from the bottom of the pedestal; and a single cover that joins with the base to form a sealed enclosure around the plurality of brackets and the fiber splice trays. Optionally, the pedestal may have: a plurality of lower holes located around the perimeter of the pedestal at a first height, with a plurality of lower brackets between the lower holes; and a plurality of upper holes located around the perimeter of the pedestal at a second height with a plurality of upper brackets between the upper holes. The upper and lower brackets can support upper and lower sets of fiber splice trays.

19 Claims, 9 Drawing Sheets

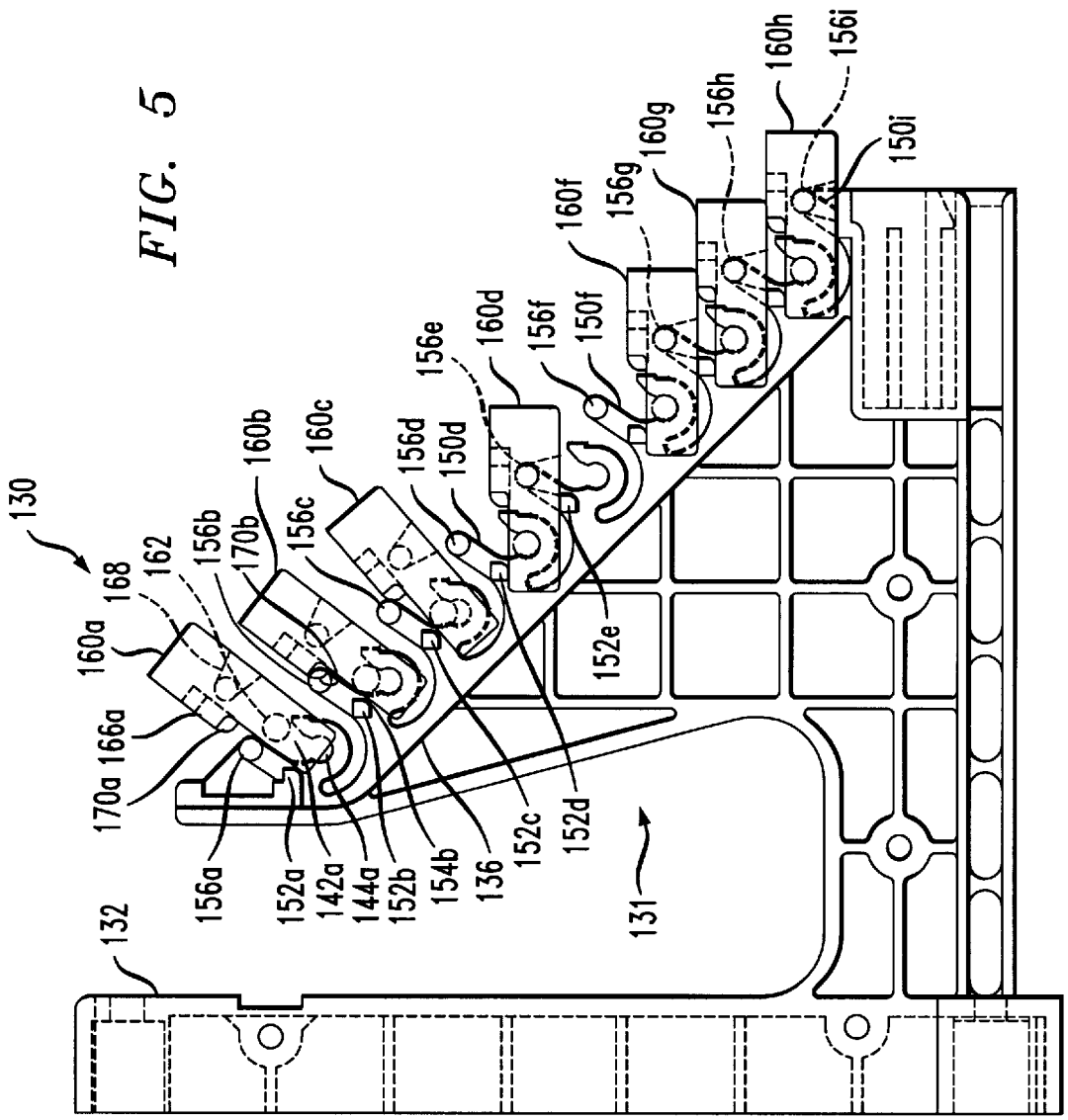

FIBER OPTICAL PEDESTAL

FIELD OF THE INVENTION

The present invention relates to telecommunications equipment generally, and more specifically to enclosures for optical fibers.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radio-magnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation.

U.S. Pat. No. 5,069,516 to Kohy et al. and U.S. Pat. No. 5,396,575 to Hayward et al. are expressly incorporated by reference herein in their entireties for their teachings on sealed fiber enclosures.

U.S. Pat. Nos. 4,913,522, 5,155,794 and 5,602,954 to Nolf et al., and U.S. Pat. No. 5,249,253 to Franckx et al. are expressly incorporated by reference herein in their entireties. These patents describe an enclosure for a butt splice of optical fiber cables.

The systems described in the above mentioned patents are limited in the number of fibers that can be accommodated. These systems cannot accommodate the large numbers of fibers that would be required to serve a modern office park or campus environment.

Further, they leave much to be desired when it is necessary to change the fiber configuration (e.g., splicing a fiber) in situ. For example, FIG. 10b of the Nolf et al. patents show an apparatus used for carrying out a combined splicing and sealing operation. The apparatus includes apparatus for selectively exposing respective trays. The apparatus is hinged so that a bar can move to allow selected trays to be held in an upright position for working on those trays.

The above described apparatus for selectively exposing trays is bulky and cumbersome to use. Other, more convenient methods have been sought to allow one of the splice trays 5 to be selectively exposed for installation or repair of a splice. In one example, a clip (not shown) has been inserted in the hinged corner between the exposed horizontal tray and the adjacent (unexposed) vertical tray immediately above the exposed tray. The clip prevents the adjacent vertical tray from pivoting downward about its hinge, maintaining the horizontal tray exposed. Although the clip is compact, it is easily lost. Further, if the worker forgets to remove the clip when the work is completed, either the clip or the trays, or both, may be damaged when the vertical trays are lowered.

An improved tray organizer system is desired.

SUMMARY OF THE INVENTION

One aspect of the present invention is a system for organizing fiber optic cables. The system includes a pedestal, at least one bracket and at least one fiber splice tray. The pedestal has a longitudinal passage therethrough. The pedestal has at least one hole on a side surface thereof. The hole penetrates from the longitudinal passage to an exterior of the pedestal. The at least one bracket is mounted to the pedestal near the hole. The bracket is capable of receiving and storing a plurality of fiber splice trays. The at least one fiber splice tray is mounted on the bracket.

Another aspect of the invention is a method of organizing fiber trays. The method includes the steps of: mounting a first plurality of brackets around a perimeter of a pedestal, the pedestal having a first plurality of holes located around the perimeter, the first plurality of brackets being mounted between respective ones of the first plurality of holes; and mounting a first plurality of fiber trays on the first plurality of brackets.

Still another aspect of the invention is a method for organizing fibers. The method includes the steps of: running a plurality of fibers through a longitudinal passage within a pedestal; passing a first one of the plurality of fibers through a first hole in a side of the pedestal; passing a second one of the plurality of fibers through one of the group consisting of the first hole and a second hole in the side of the pedestal; and forming a splice between the first fiber and the second fiber on a first fiber tray coupled to the pedestal.

The above and other features of the present invention will be better understood from the following detailed description of the exemplary embodiment of the invention which is provided in connection with the accompanying drawings.

BRIEF DESCRIPTION OF THE DRAWINGS

FIG. 5 is a side elevation view of the tray carrier of FIG. 4, showing the insertion of tray hinges on the carrier. The hinges are shown, but the remainder of the trays 180a–180h are omitted from FIG. 5, solely to simplify the drawing.

DETAILED DESCRIPTION

Figure 1A:
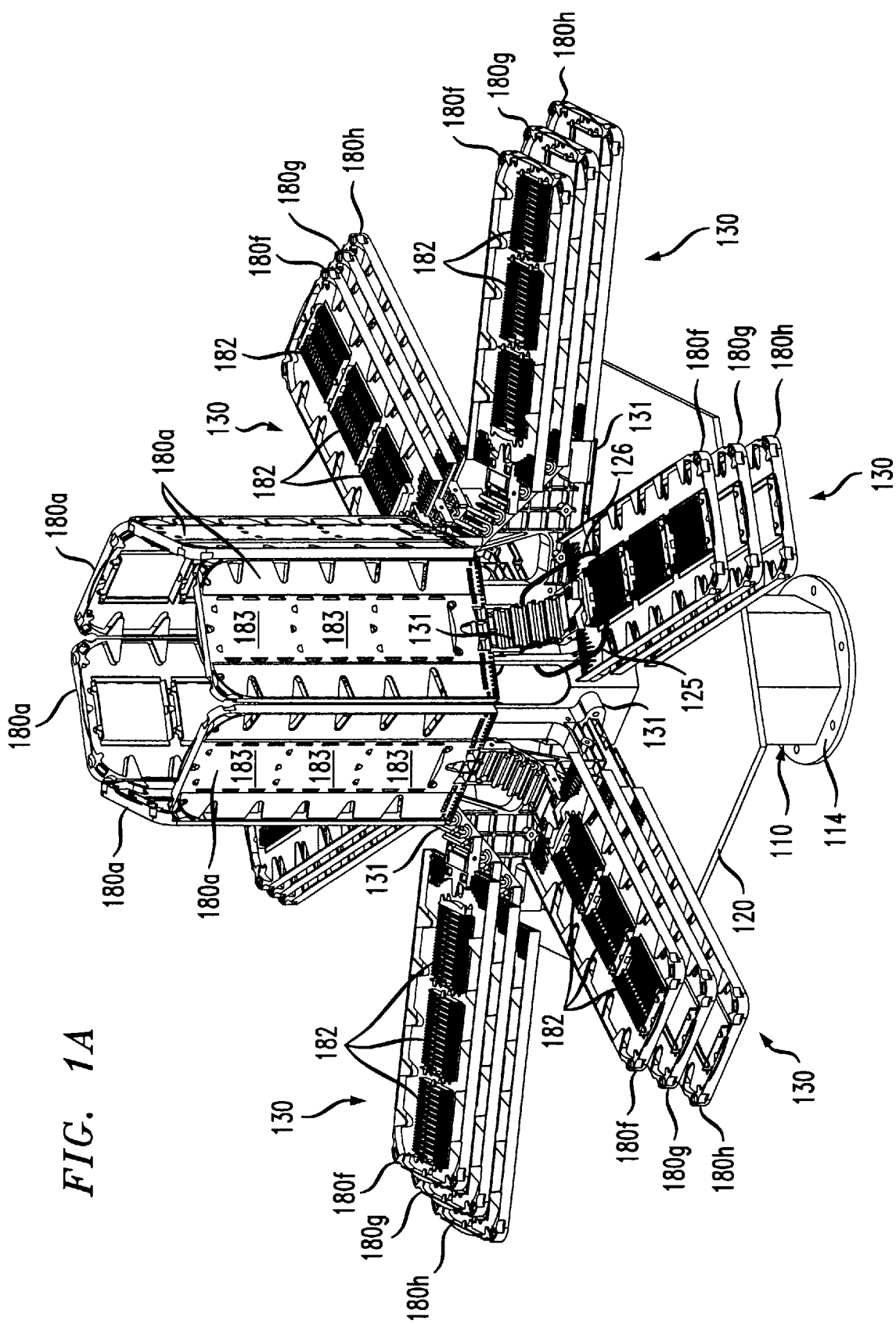
FIG. 1A is an isometric view of a first exemplary high density fiber optical pedestal according to the invention.
Figure 1B:
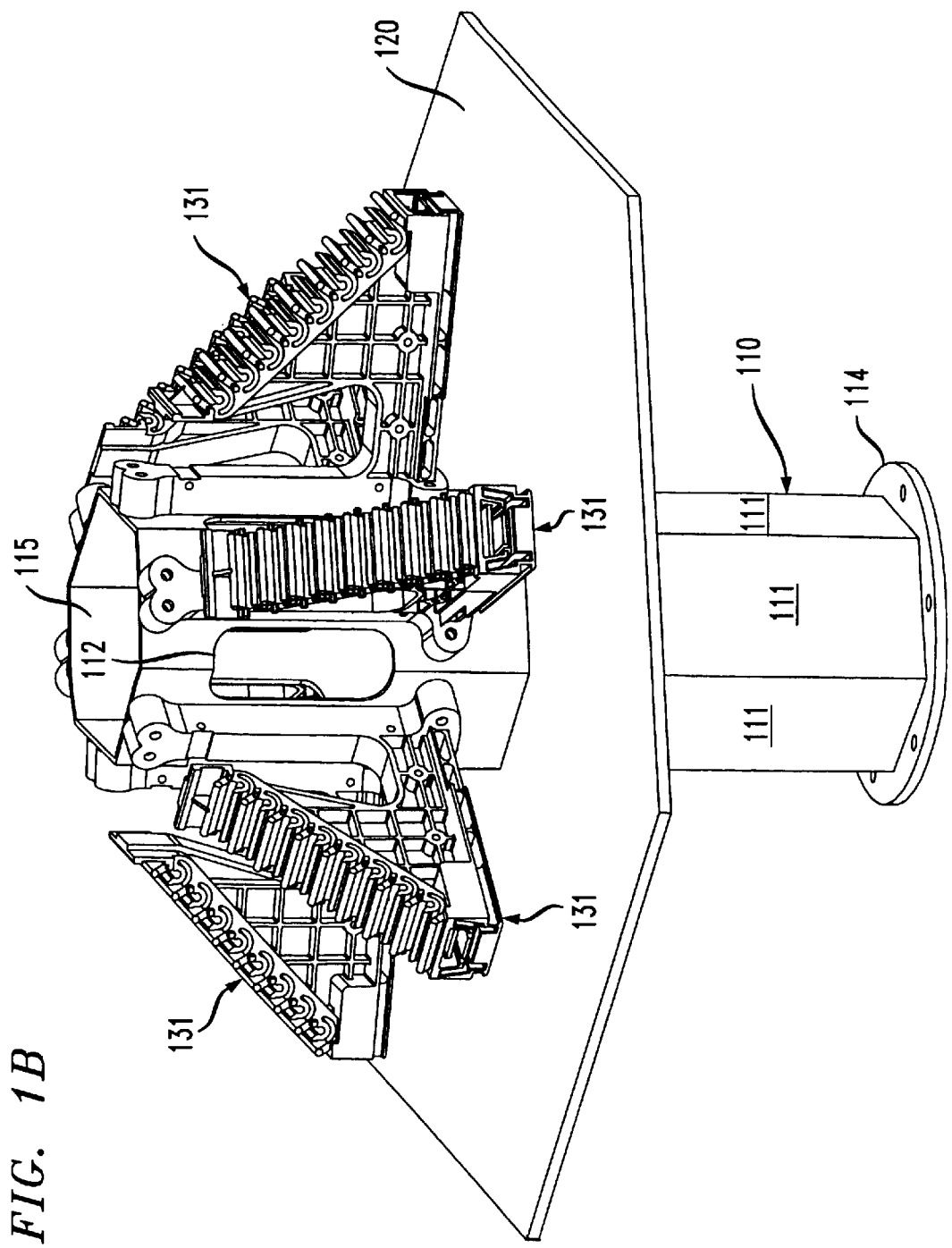
FIG. 1B is an isometric view of the pedestal of FIG. 1, with the fiber splice trays removed.
Figure 2:
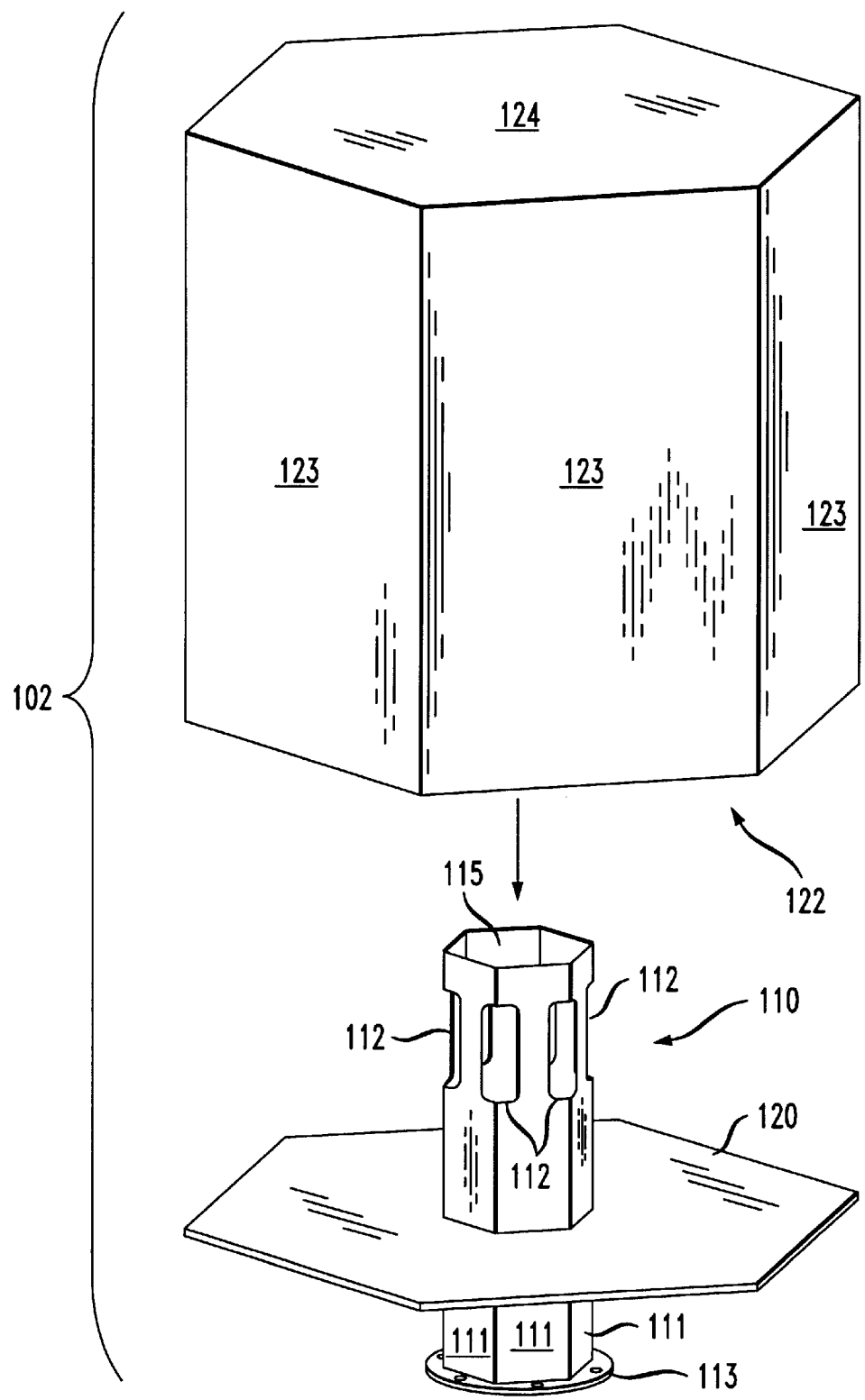
FIG. 2 is an exploded isometric view showing the pedestal of FIG. 1B (without the fiber tray carriers), including the base plate and cover.

One aspect of the present invention is a system 100 for organizing optical fibers. FIGS. 1A, 1B and 2 show a first exemplary high density fiber optical pedestal assembly 100 according to the present invention. The main components shown in FIGS. 1A–2 include a pedestal 110, at least one tray carrier or bracket 131, and at least one fiber splice tray 180a–180h. Also, a base plate 120 and cover 122 are provided to form a sealed enclosure for sealingly containing the pedestal 110 and equipment.

In FIG. 1B, the trays 180a–180h are removed for ease of viewing the remaining components. FIG. 2 shows the pedestal 110, base 120 and cover 122 without the remaining components for ease of viewing.

The pedestal 110 has a longitudinal passage 115 therethrough. The passage 115 extends throughout the length of the pedestal 110. Fibers can be run underground, and can enter the pedestal through the passage 115. The exemplary pedestal has a cross-section (in a horizontal plane) in the shape of an equilateral hexagon. The pedestal may have a variety of other shapes. For example, the pedestal may have a circular or elliptical cross section, or the cross section may be any polygon having at least three sides. If the pedestal has a polygonal cross section, then an equilateral polygon is preferred (but not required).

Preferably, the top of the pedestal 110 is left open, as shown in FIG. 1B. This makes it easy for a worker to reach into the passage 115 to access the fibers in the passage, when routing the fiber. The top of the pedestal 110 does not require a cap, because the entire assembly is covered by cover 122. The top of pedestal 110 may have its own cap (not shown), but such a cap would make it more difficult to access the fibers. Preferably, if the pedestal has a cap, the cap is removable.

The pedestal 110 has at least one hole 112 on a side surface thereof. The at least one hole 112 penetrates from the longitudinal passage 115 to an exterior of the pedestal 110. In the exemplary embodiment, there are six holes positioned at the corners connecting respective sides 111 of the pedestal. Although positioning the holes in the corners may be preferred, it is not a requirement. For example, the holes may be positioned on the flat faces 111 of the pedestal, above or below the tray carrier brackets 131. The holes 112 may be cut out from, or molded into, the pedestal before installation, or the holes may be cut or punched out as needed. For example, the pedestal may be provided with a plurality of indentations to facilitate punching out the holes 112 as they are required. The holes may be any convenient shape. Preferably, if the tray carrier 131 accommodates several trays 180a–180h as in the exemplary embodiment, then the holes 112 are elongated, so as to facilitate routing of fibers from inside the pedestal 110 to any one of the trays 180a–180h.

Also included, but not shown, are a plurality of fastener holes for receiving the fasteners 135, for mounting the tray carrier brackets 131 on the pedestal 110.

FIG. 1A shows only one pair of fibers 125, 126 reaching from passage 115 out to one of the splice trays 180f. Additional fibers would typically be installed, but are omitted from FIG. 1A to simplify the drawing.

The system 100 includes at least one tray carrier bracket 131 mounted to the pedestal 110 near the hole 112. The exemplary embodiment has six brackets 131, but any number may be used. Each bracket 131 is capable of receiving and storing a plurality of fiber splice trays 180a–180h. The details of an exemplary tray carrier bracket 131 are described below, in a separate section.

To use the system for terminating or splicing fibers, at least one fiber splice tray 180a–180h is mounted on the bracket 131. In a full configuration, each of the six brackets 131 has eight fiber splice trays 180a–180h, but brackets capable of receiving fewer or more than eight trays may be used. Any combination of full, partially full, and empty tray carrier brackets 131 may be used. Preferably, the plurality of brackets 131 are located between respective ones of the plurality of holes 112, as shown. With an arrangement of alternating holes 112 and brackets 131, it is convenient to route fibers from the passage 115 of the pedestal 110 to any of the trays 180a–180h for splicing. Given any tray 180a–180h positioned between two respective holes 112, a fiber or portion of a fiber can be routed through a respective hole on each side, and approach one of the splice mounts 182 from opposing sides. It is also possible to route two fibers that are to be splice together through a single hole 112.

Also, as shown in FIG. 2, a single base plate 120 is mounted on the pedestal 110 (below the plurality of holes 112), at a distance from the bottom of the pedestal; and a single cover 122 joins with the base plate to form a sealed enclosure around the plurality of brackets 131 and fiber splice trays 180a–180h. An exemplary height for the base 120 is about 12 inches (30 centimeters). The height should be selected so that the base 120 is above the level of any water that could reasonably be anticipated should flooding occur in the location at which the pedestal is installed. A seal, such as a gasket (not shown) is used to prevent moisture from entering the enclosure.

The pedestal 110 further includes a mounting plate or flange 114. Preferably, the mounting flange 114 has a plurality of holes through which fasteners (e.g., bolts) pass to securely attach the pedestal to the "ground". Preferably, the pedestal 110 is mounted on a stabile solid body, such as a cement slab (not shown). The slab has a conduit or passage therethrough. Cables containing the optical fibers can be routed through the conduit, into the passage 115 of the pedestal 110.

Preferably, the pedestal 110 is made of a strong, corrosion resistant material, such as stainless steel, plated steel or carbon steel. Other materials, such as strong plastics, may also be used. The base plate 120 and mounting flange 114 may be formed integrally with the pedestal 110 from the same piece of material, or may be formed separately and welded to the pedestal. The cover 122 may be formed from steel or a weather resistant plastic. A plastic material is advantageous because its lower weight makes it easier for a worker to remove the cover when accessing the fiber trays 180a–180h.

Figure 9:
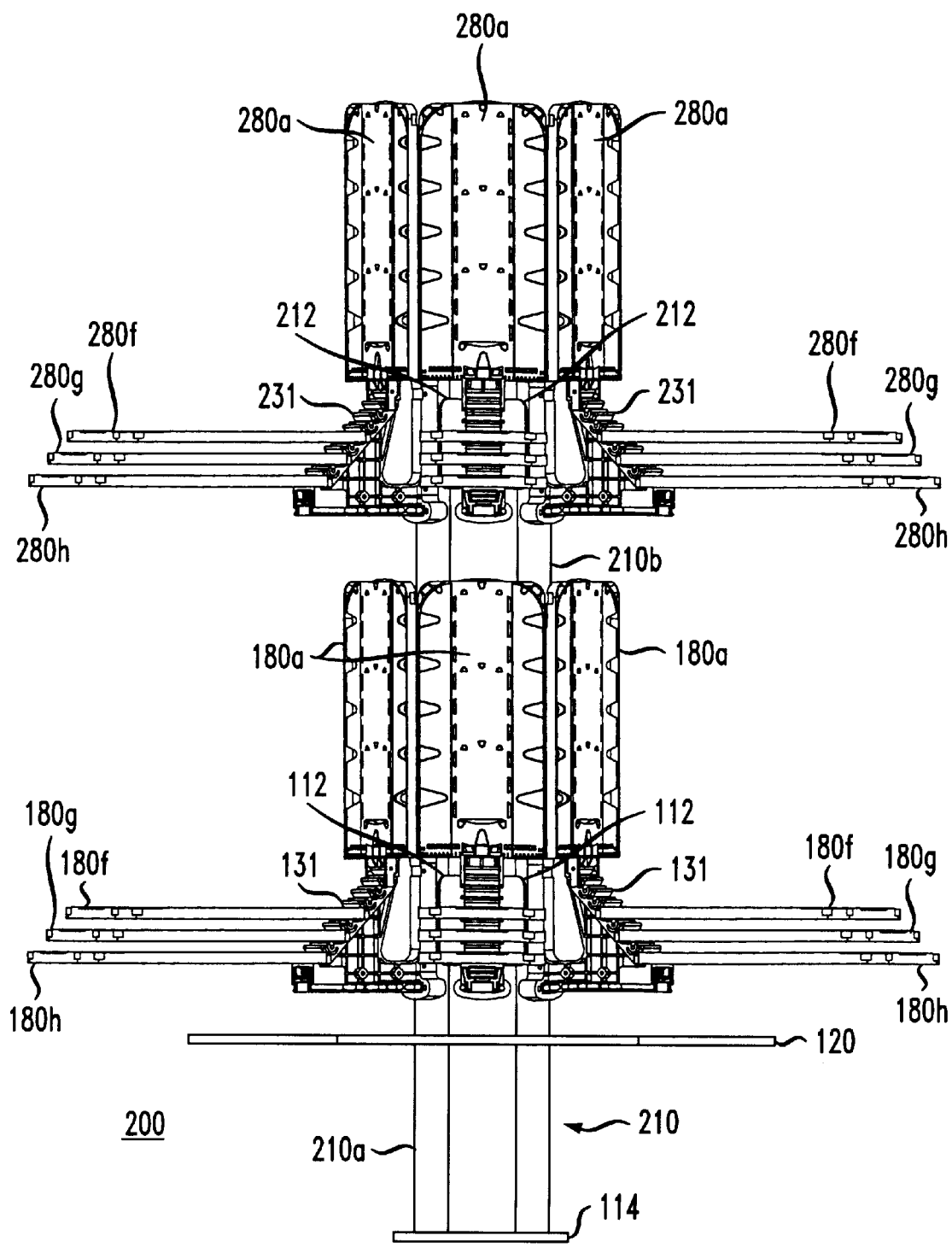
FIG. 9 is a front elevation view of a second exemplary high density fiber optical pedestal according to the invention.

FIG. 9 shows a second exemplary embodiment of the invention, including holes 112, brackets 131 and trays, 180a–180h and 280a–280h on a plurality of levels. The multi-level configuration 200 includes a lower pedestal portion 210a and an upper pedestal portion 210b. The two pedestal portions 210a and 210b may be integrally formed from a single piece of material 210. Alternatively, the two pedestal portions 210a and 210b may be separate pieces. For example, the upper pedestal portion 210b may have a sleeve (not shown) that extends inside the top of pedestal 210a (which may be the same as pedestal 110 shown in FIG. 2). The sleeve (not shown) would be of the same general shape as the pedestal 210a (e.g., hexagonal in the example), with a slightly smaller dimension, so that the two pedestal portions fit snugly together. A fastener may optionally be used to firmly secure the upper pedestal portion 210b to the lower pedestal portion 210a.

By forming upper pedestal portion 210b as a separate detachable piece, it becomes possible to expand the assembly 200 to accommodate additional fiber trays by simply removing the cover 122, mounting the second portion 210b on the pedestal 210a, and replacing the cover 122 with a taller cover (not shown) sized to accommodate both pedestal portions. This "modular" approach allows the system to grow over time, to accommodate the increasing bandwidth requirements of the users, without a huge initial investment.

The multi-level configuration includes at least one lower hole 112 at a first height, and at least one upper hole 212 at a second height above the first height. Preferably, a plurality of lower holes 112 are located around the perimeter of the lower pedestal portion 210a at the first height, and a plurality of upper holes 212 are located around the perimeter of the upper pedestal portion 210b at the second height. The assembly 200 further includes: at least one lower bracket 131 near the lower hole, and at least one upper bracket 231 near the upper hole 212. Preferably, a plurality of lower brackets 131 are located between respective ones of the lower holes 112, and a plurality of upper brackets 231 are located between respective ones of the upper holes 212.

As shown in FIG. 9, the second height (at which the upper tray carrier brackets 231 are mounted) is separated from the first height (at which the lower tray carrier brackets 131 are mounted) by a distance that is at least large enough to simultaneously accommodate a lower splice tray 180a stored in a vertical position in the lower bracket 131 and an upper splice tray 280h positioned in a horizontal position in the upper bracket 231.

Although FIG. 9 only shows tray carriers 131 and trays on two levels, any desired number of levels may be used. This may be achieved either by combining a pedestal 210a with any desired number of upper pedestal portions 210b, or by forming a single pedestal 210 having holes at any desired number of levels.

Another aspect of the invention is a method of organizing fiber trays 180a–180h. Referring again to FIGS. 1A, 1B, and 2, the method includes the steps of: mounting a first plurality of brackets 131 around a perimeter of a pedestal 110, the pedestal having a first plurality of holes 112 located around the perimeter, the first plurality of brackets being mounted between respective ones of the first plurality of holes; and mounting a first plurality of fiber trays 180a–180h on the first plurality of brackets. The method may include mounting at least two of the fiber trays 180a–180h on at least one of the first plurality of brackets 131, as shown in FIG. 1A.

Referring again to FIG. 9, the method of organizing fiber trays may include mounting a second plurality of brackets 231 around a perimeter of a pedestal 210, the pedestal having a second plurality of holes 212 located around the perimeter above the first plurality of holes 112, the second plurality of brackets 231 being mounted between respective ones of the second plurality of holes 212; and mounting a second plurality of fiber trays 280a–280h on the second plurality of brackets 231.

Another aspect of the invention is a method for organizing fibers 125, 126. The method includes the steps of: running a plurality of fibers 125, 126 through a longitudinal passage 115 within a pedestal 110; passing a first one of the plurality of fibers 125 through a first hole 112 in a side of the pedestal; passing a second one of the plurality of fibers 126 through either the first hole 112 or a second hole 112 in the side of the pedestal 110; and forming a splice between the first fiber 125 and the second fiber 126 on a first fiber tray 180f coupled to the pedestal.

Preferably, the second fiber 126 is passed through a second hole 112 in the pedestal 110, so that the two fibers 125, 126 approach the splice holder 182 from opposite sides. In general it is preferable to include the step of passing each pair of fibers, within the plurality of fibers that are to be spliced, through a respective pair of successive holes 112 in the pedestal 110, and using one of the splice trays 180a–180h between the pair of successive holes for splicing the respective pair of fibers.

Notably, the method may include using a single one of the holes 112 to pass fibers to two different trays 180a–180h on opposite sides of the hole. This may occur, for example, in a system where the pedestal 110 has at least three holes 112 and two fiber trays 180a–180h at respectively different positions between the first and second holes and between the second and third holes. The method may then include the further steps of passing a fiber through the left hole; passing two fibers through the center hole, and passing a fiber through the right hole. A first splice is formed between the left fiber and one of the fibers in the center hole. The first splice is formed on a tray 180f located between the left and center holes 112. A second splice is formed between the remaining fiber in the center hole 112 and the right fiber. The second splice is formed on a tray 180f located between the center and right holes 112. Thus, each hole 112 may be used to service any of the trays 180a–180h on either side of that hole.

If the pedestal has two levels of splice trays, the method may include only forming a splice between a pair of fibers on the same level. Alternatively, the method may include forming a splice between two fibers that have terminations or splices at respectively different levels. Thus, a single fiber can have a first splice in a splice holder on the lower level and a second splice in a splice holder on the upper level.

The Exemplary Tray Carrier

Reference is now made to FIGS. 3–8. The pedestal 110 has at least one fiber tray organizer 130 attached to its interior surface. The tray organizer 130 includes a tray carrier 131 and a plurality of fiber trays 180a–180h (Only trays 180a and 180f–180h are shown in FIG. 1A). The tray carrier 131 has a mounting plate 132 with mounting holes 134, which may be used attach the mounting plate 132 to the pedestal 110 using fasteners 135. A diagonal bracket 136 is attached to the mounting plate 132. Bracket 136 lies on a diagonal with respect to the pedestal 110, and with respect to the positions of the trays 180a–180h mounted on the bracket 136. The trays 180a–180h have a plurality of attachment sections 183 (shown in FIG. 8) into which optical fiber splice holders 182, connectors (not shown) or standard end fiber terminations (not shown) can be retained.

Figure 4:
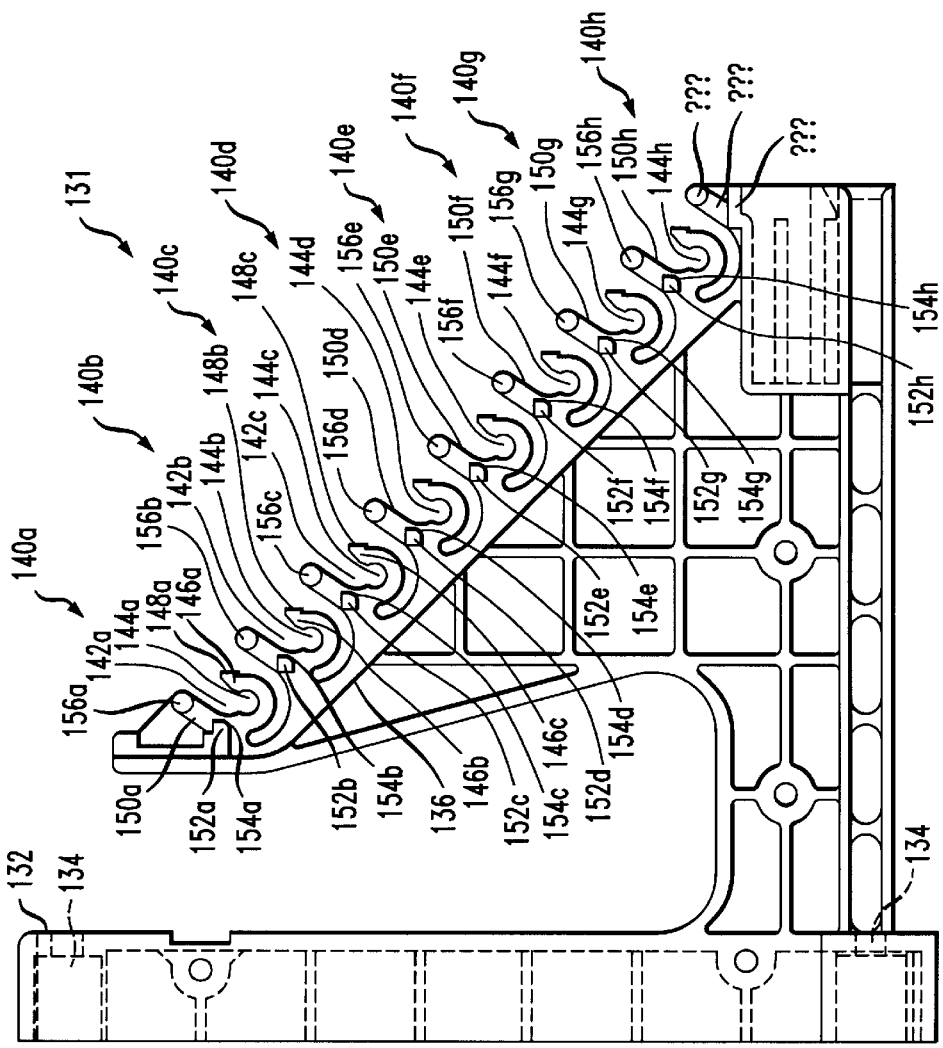
FIG. 4 is a side elevation view of the tray carrier of FIG. 3.
Figure 3:
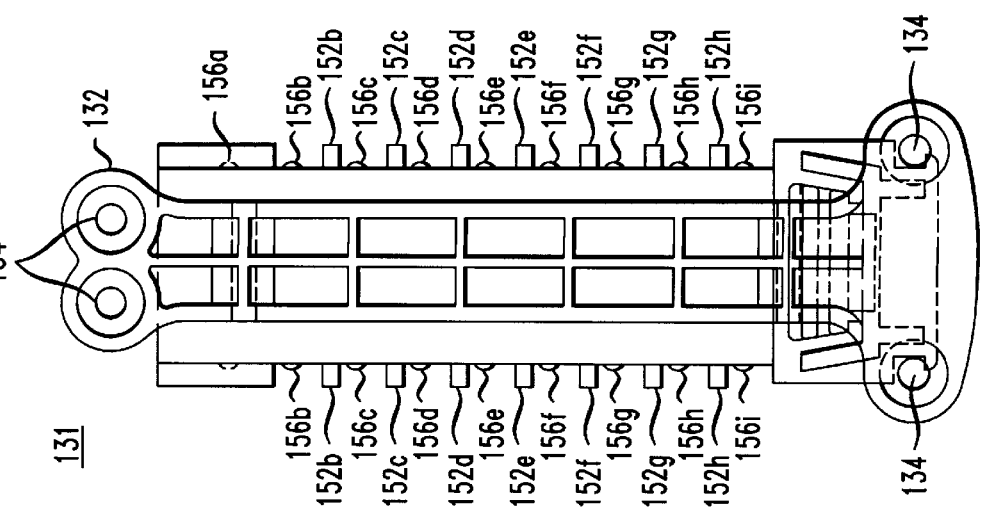
FIG. 3 is a rear view of one of the tray carriers shown in FIG. 1B.
Figure 6:
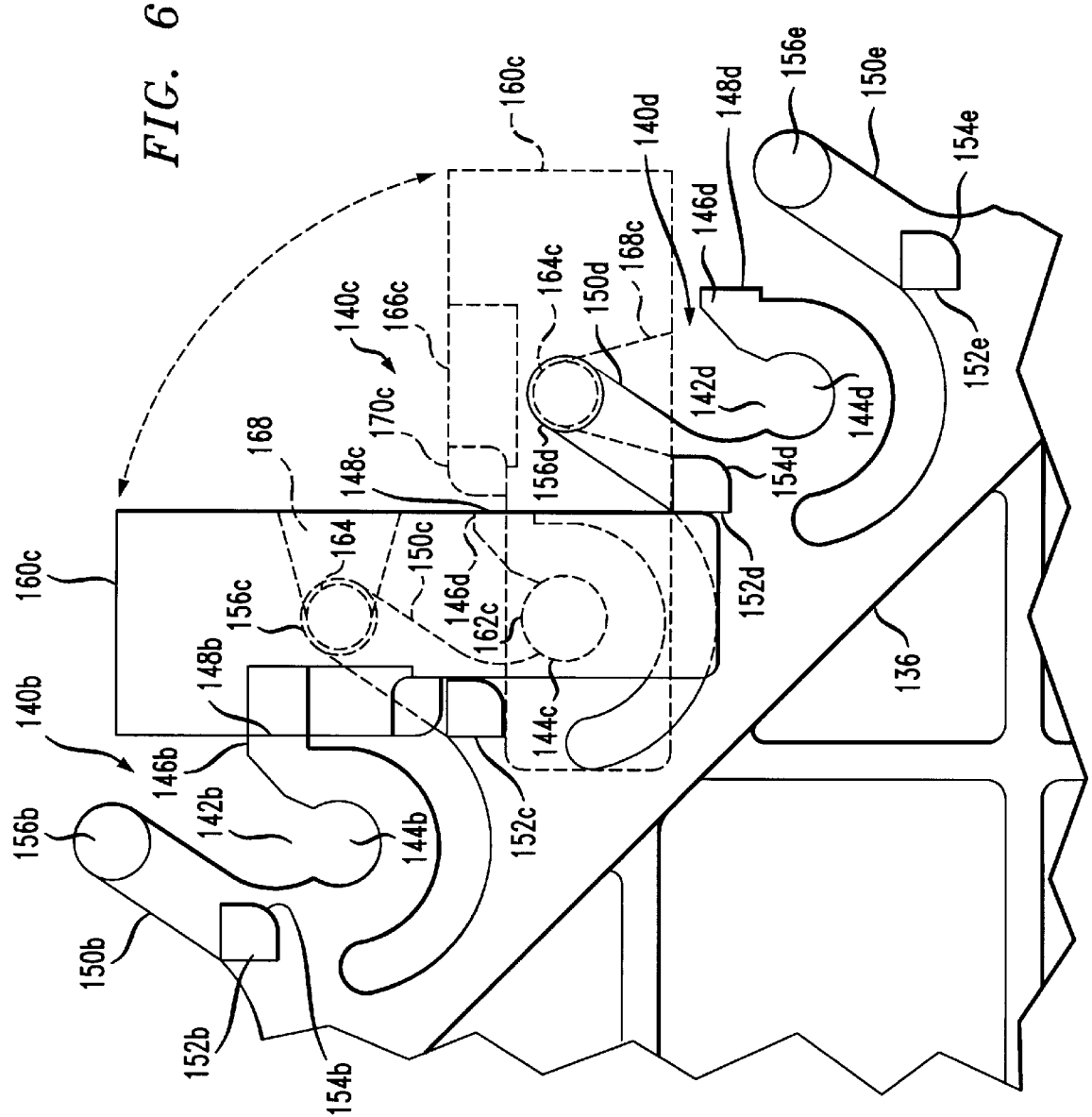
FIG. 6 is an enlarged detail of a portion of the tray carrier of FIG. 5, showing the two alternate positions of the tray hinge.
Figure 7:
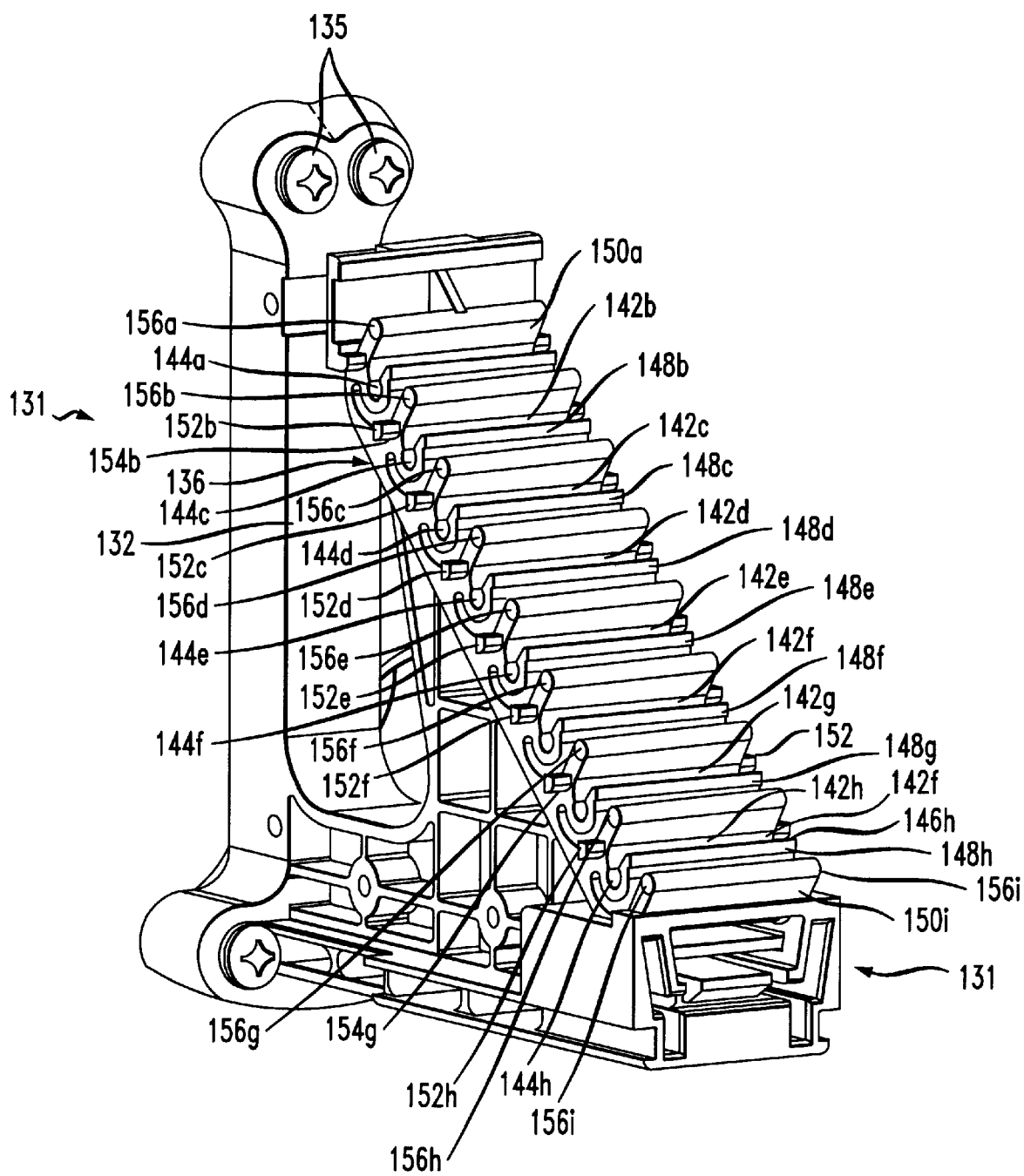
FIG. 7 is an isometric view of a the tray carrier of FIG. 4.

FIGS. 3–7 show the exemplary tray carrier 131. FIGS. 3 and 4 show the tray carrier 131 of the fiber organizer 130 standing alone. FIG. 5 shows the tray carrier 131 with the hinge portions 160a–160h of the trays 180a–180h inserted in the sockets 140a–140h. FIG. 6 shows an enlarged detail of the tray carrier 131 with tray 180c installed. FIG. 7 shows the tray carrier 131 mounted on the pedestal 110.

Referring again to FIG. 4, the tray carrier 131 includes a bracket 136 that includes a plurality of sockets 140a–140h. The bracket 136 is diagonal to a plane in which the trays 180a–180h lie when the trays are in the first (vertical in FIG. 1A) position. A plurality of extension members 150a–150i are attached to bracket 136. The members 150a–150i are approximately perpendicular to the bracket 136. Each member 150a–150i has a pair of bosses, 156a–156i, respectively on both sides of the extension member. The sockets 140a–140h and bosses 156a–156i alternate with each other on the tray carrier 131.

According to an aspect of the invention, each fiber tray 180a–180h can be placed in one of two detent positions, which are shown as vertical and horizontal positions in FIG. 1A. Tray 180a is in the first (vertical) detent position, and trays 180f–180h are in the second (horizontal) detent position. Once placed in either detent position, the tray remains in that position until a force is applied to move the tray. The detents allow the trays to be placed in the desired position without using an external fixture, and without inserting an external stop, clamp or clip onto the assembly. By providing the two detent positions, the tray organizer 130 allows any tray to be moved between the first and second positions simply by applying a predetermined force to the tray. It is unnecessary for any external mechanism to be applied.

Reference is now made to FIGS. 4–6. In the exemplary embodiment, for each individual socket 140a–140h, the first-position detent includes a first boss 156a–156h, respectively, above the sleeve 144a–144h, respectively. Each socket 140a–140h has a respective second-position detent that includes a second boss 156b–156i respectively, below the sleeve 144a–144h of the socket 140a–140h. For example, as shown in FIG. 6, socket 140c has a first position detent including a first boss 156c above sleeve 144c and a second-position detent including boss 156d below sleeve 144c of socket 140c. The tray carrier 131 has a plurality of extension members 150a–150h on which respective bosses 156a–156h are located. Each diagonal member 150a–150h has one of the plurality of sockets 140a–140h depending therefrom. The boss 156a–156h on the member 150a–150h from which a socket 140a–140h depends forms the first-position detent associated with that socket. Sleeves 144a–144h are formed within hooks 146a–146h depending from respective members 150a–150h.

For each socket 140a–140h, the tray carrier 131 includes a first stop 152a–152h respectively, above the sleeve 144a–144h. For example, socket 140a has a corresponding first stop 152a, above sleeve 144a. The first stops 152a–152h (above the sockets) prevent the trays 180 from rotating counter-clockwise beyond the first position (vertical in FIG. 1A). Each socket 140a–140h has a respective second stop 152b–152i below the sleeve 144a–144h. For example, socket 140a has a corresponding second stop 152b, below sleeve 144a. The second stops 152b–152i prevent the trays 180 from rotating clockwise beyond the second position (horizontal in FIG. 1A).

Each optical fiber organizer 130 can include a plurality of optical fiber trays 180a–180h. Each tray 180a–180h has a top side for holding one or more fibers (not shown). Each tray 180a–180h has a hinge portion 160a–160h, respectively. Sockets 140a–140h are capable of receiving the respective hinge portions 160a–160h of respective trays 180a–180h. Each tray 180a–180h has a first position on the tray carrier 131 (the vertical position in FIG. 1A). The trays 180a–180h are stacked parallel to each other when the trays are in the first position. The first position is suitable for storing the trays 180a–180h within the optical fiber enclosure 120. Sockets 140a–140h have associated first-position detents 156a–156h, respectively, for maintaining respective trays 180a–180h in the first position. Sockets 140a–140h have associated second-position detents 156b–156i, respectively, for maintaining respective trays 180a–180h in the second position (the horizontal position in FIG. 1A). For example, socket 140a has a first-position detent 156a and a second-position detent 156b. The top side of one of the trays 180a–180h is exposed when at least one of the trays is in the second position. For example, in FIG. 1A, the top side of tray 180f is exposed.

In the exemplary embodiment, the first and second positions differ from each other in angle by about 90 degrees. Thus, when the pedestal 110 is mounted vertically, the trays 180a–180h in the second position are horizontal. This horizontal position is both a stable position, and a position providing easy access to the exposed fiber tray, and is thus preferred. Other angles may be used. For example, the trays in the second position may be in any position that is at least about 45 degrees or more from the first position.

Figure 8:
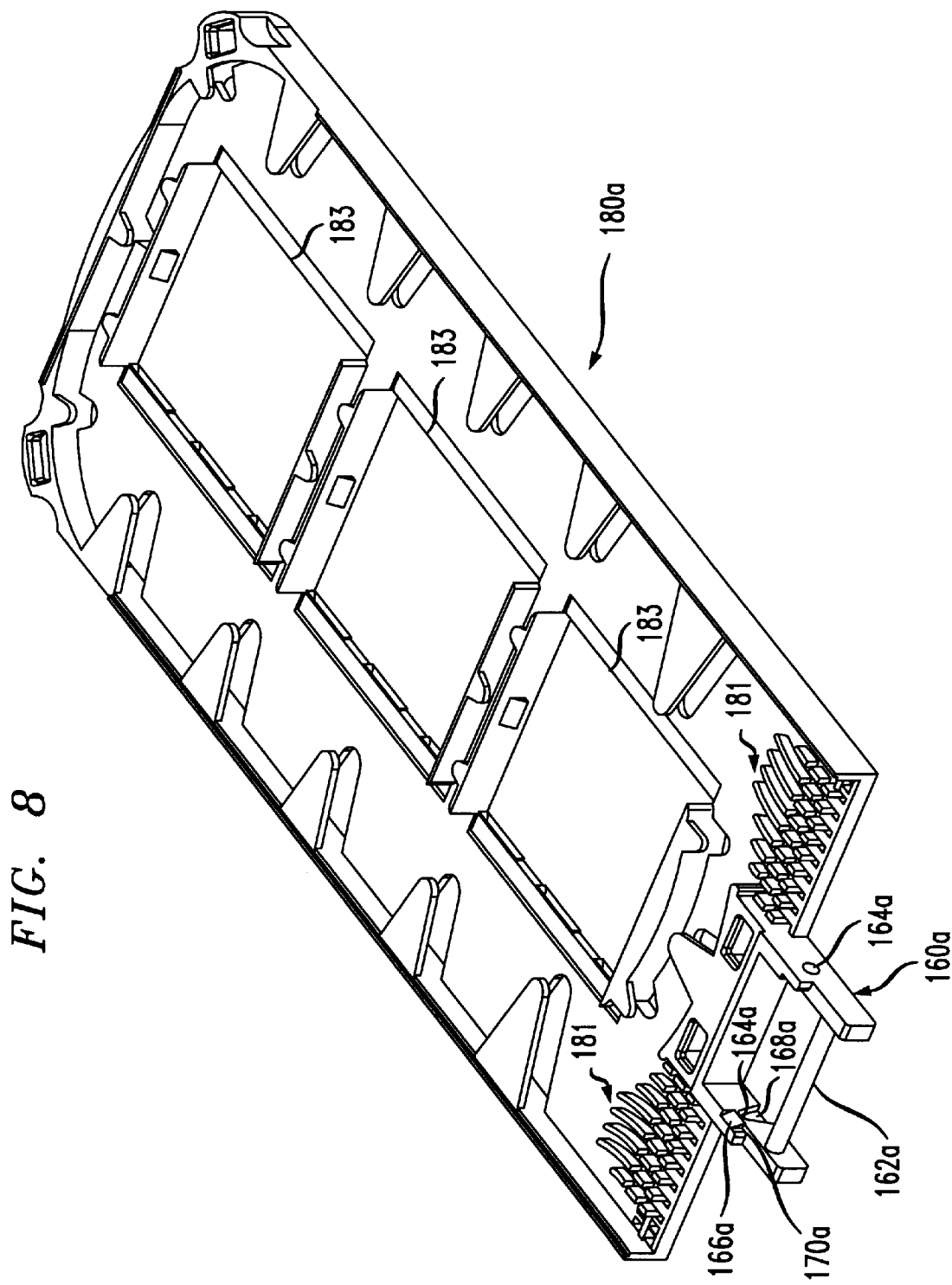
FIG. 8 is an isometric view of one of the splice trays shown in FIG. 1A.

FIG. 8 shows an exemplary tray 180a. Trays 180b–180h may be similar to tray 180a. The hinge portions 160a–160h of respective trays 180a–180h pivot within sleeves 144a–144h. Hinge portions 160a–160h have respective holes 164a–164h capable of receiving either the first boss 156a–156h, above respective sleeves 144a–144h, or the second boss 156b–156i below respective sleeves 144a–144h. For example, as shown in FIG. 6, the hinge portion 160c of tray 180c (in socket 140c) has a hole 164c capable of receiving either the first boss 156c above socket 140c or the second boss 156d below socket 140c.

The hinge portions 160a–160h of respective trays 180a–180h each have a pair of ramps 166a–166h and 168a–168h, respectively. The ramps 166a–166h and 168a–168h are adjacent respective holes 164a–164h. Ramps 166a–166h guide the respective first bosses 156a–156h of the tray carrier 131 to respective holes 164a–164h. Ramps 168a–168h guide the second bosses 156b–156i of the tray carrier 131 to respective holes 164a–164h. For example, as shown in FIG. 6, hinge portion 160c of tray 180c has a ramp 166c for guiding the first boss 156c into hole 164c, and a ramp 164c for guiding the second boss 156d into hole 164c.

As best seen in FIG. 6, the diameter of the bosses 156a–156i is larger than the diameter of the holes 164a–164h which the bosses engage. While one of the bosses 156a–156i is inside its respective hole 164a–164h, a tilted edge of the boss rests on the edge of the hole. Consequently, when a force is applied to rotate the tray, the tilted edge guides the boss out of the hole, without shearing the boss off. The respective sizes of the bosses 156a–156i and the holes 164a–164h may be designed to adjust the amount of force required to move the tray 180a–180h out of their detent positions. In the exemplary embodiment, the bosses 156a–156i and holes 164a–164h are sized so that a moment of about 10–14 inch-lbs. is required to move the tray away from its detent position.

According to another aspect of the exemplary embodiment, as best seen in FIG. 5, a single boss 156b–156g acts as the second-position detent associated with (and positioned below) a first one of the sockets 140a–140g and as the first-position detent associated with (and positioned above) a second one of the sockets 140b–140h, the second socket being adjacent the first socket. For example, boss 156b acts as the second-position (lower) detent for socket 140a and as the first-position (upper) detent for socket 140b. Similarly, boss 156c acts as the second-position detent for socket 140b and as the first-position detent for socket 140c.

Although the exemplary detents include bosses 156a–156i on the tray carrier 131 and holes 164a–164h on the trays 180a–180h, respectively, the positions may be reversed. That is, the detents may include holes on the tray carrier 131 and bosses on the hinge portions of the trays. Further, other types of detent mechanisms may be used.

The tray carrier 131 includes a plurality of stops. Each socket 140a–140h has a first stop 152a–152h for preventing the respective tray 180a–180h received by that socket from rotating beyond the first (vertical) position. Each socket 140a–140h has a second stop 152b–152i for preventing the respective tray 180a–180h received by that socket from rotating beyond the second (horizontal) position. For example, as shown in FIG. 6, socket 140c has a first stop 152c for preventing the tray 180c (including hinge portion 160c) from rotating beyond the first position (shown in solid lines), and a second stop 152d for preventing the tray 180c from rotating beyond the second (horizontal) position, shown in phantom.

In the exemplary embodiment, the stops are protrusions 152a–152i. Stops 152a–152i are located at the proximal end of respective extension members 150a–150i. Stops 152a–152h have rounded corners 154a–154h, respectively. Each socket 140a–140h is positioned between two of the stops 152a–152h, so that the stops 152a–152i and sockets 140a–140h alternate with each other.

According to another aspect of the exemplary embodiment, protrusions 152b–152h act as the second stops associated with respective sockets 140a–140g, and as the first stops associated with respective adjacent sockets 140b–140h. For example, protrusion 152b acts as the second stop for socket 140a (preventing tray 180a from moving clockwise past the horizontal position), and as the first stop for socket 140b (preventing tray 180b from moving counter-clockwise past the vertical position).

In the exemplary embodiment, each sleeve 144a–144h is included in a hook-shaped body 146a–146h of the socket 140a–140h and has a substantially vertical surface 148a–148h at an end thereof. The vertical surfaces 148a–148g of respective sockets 140a–140g act as additional first-position stops to limit rotation of respective trays 180b–180h that have respective pivot pins 160b–160h inserted in sockets 140b140h. For example, vertical surface 148a of socket 140a acts as an additional first-position stop to limit counter-clockwise rotation of tray 180b (which has pivot pin 160b in socket 140b, which is adjacent to the socket 140a).

The tray carrier 131 and trays 180a–180h may be formed from a variety of materials, such as polycarbonate, polyvinyl chloride (PVC), acrylonitrile-butadiene-styrene (ABS) or other flexible polymers.

In the exemplary embodiment, each socket 140a–140h has a respective substantially cylindrical sleeve portion 144a–144h, a respective entrance portion 142a–142h connected to the sleeve portion, and a constriction therebetween. The constriction is smaller than a diameter of the sleeve portion 144a–144h, and is smaller than the diameter of the pivot pins 162a–162h of the trays 180a–180h. A benefit of this construction is that, once inserted in the sleeves 144a–144h, the trays 180a–180h cannot easily work loose. However, force is required to insert the pivot pin 162a–162h past the constriction into the sleeve 144a–144h of the socket 140a–140h.

Another aspect of the exemplary embodiment is a structure that facilitates the insertion of trays 180a–180h into the sockets 140a–140h, respectively, while providing a snug fit to eliminate tray wobbling.

FIG. 5 shows the structure and method for inserting trays 180a–180h in the tray carrier 131. Trays 180a–180h have pivot pins 162a–162h, respectively. Each socket 140a–140h is capable of having the pivot pin 162a–162h of a respective tray 180a–180h inserted therein and allowing the respective tray to rotate therein. The respective first protrusion 152a–152h proximate to and above each socket 140a–140h is positioned so that the respective tray 180a–180h being inserted in the socket 140a–140h acts as a class 2 lever. (A class 2 lever has the fulcrum on one end, the force on the opposite end, and the load in the center.) The respective protrusions 152a–152h act as the fulcrums of the respective levers, to forcibly insert the pivot pins 162a–162h of the trays 180a–180h into their respective sockets 140a–140h by applying a force on the trays. Each of the protrusions 152a–152h has a rounded corner 154a–154h, where the hinge portion 160a–160h that includes the pivot pin 162a–162h contacts the protrusion.

For example, the socket 140a is capable of having the pivot pin 162a of tray 180a inserted therein and allowing the tray 180a to rotate therein. Protrusion 152a is proximate to and above the socket 140a. The protrusion 152a is positioned so that the tray 180a acts as a lever while being inserted in the socket 140a, and the protrusion 152a is a fulcrum of the lever (tray 180a), to forcibly insert the pivot pin 162a into the socket 140a by applying a force on the tray.

In this case, the fulcrum is the protrusion 152a–152h. The load is the pivot pin 162a–162h, which is being forced into the sleeve 144a–144h. The force may be applied on any part of the tray 180a–180h. For the greatest leverage and easiest insertion, the force is applied to the distal end of the tray 180a–180h, farthest from the pivot pin 162a–162h. The moment arm (normal distance) between the protrusion and the pivot pin in the socket is substantially less than a moment arm between the protrusion and a portion of the tray on which the force is applied. As shown in FIG. 5, even if the force is applied at the near end of the tray 180a–180h, the moment arm between the protrusion and the pivot pin is substantially less than the moment arm between the protrusion and the distal end of the hinge portion, where the hinge portion is connected to the tray. Thus, even if the force is applied at the proximal end of the tray, substantial leverage is obtained.

FIG. 5 shows hinge portions 160a–160d in various stages during the insertion process. Hinge portion 160a is being introduced into the entrance 142a of socket 140a. The tray 180a and hinge portion 160a are held at a steep angle so the pivot pin 162a can enter the socket entrance 142a, and the leading edge of hinge portion 160a slides under protrusion 152a.

Hinge portion 160b has been inserted until the pivot pin 162a reaches the constriction between the entrance 142a and sleeve 144a. The rounded edge 154b of protrusion 152b facilitates insertion and prevents hinge portion 160b from being nicked. A beveled edge 170b of the hinge portion 160b provides a clearance for the boss 156b of the detent mechanism. At this point, the clockwise rotation of hinge portion 160b begins.

Hinge portion 160c is partially rotated. Force is applied on the tray 180c. The stop 152c acts as a fulcrum and the force is magnified and applied to the pivot pin 162c over a small moment arm. The pivot pin 162c applies a force on the constriction between entrance 142c and sleeve 144c, causing the hook-shaped socket 140c to open.

Hinge portion 160d is completely rotated. The pivot pin 160d is completely captured within sleeve 144d. The protrusions 152d and 152e apply a coupled moment to prevent further clockwise rotation of the tray 180d. Pivot pin 162d is now held snugly within the sleeve 144d of socket 140d. Once the tray is completely inserted in this fashion, the tray can be rotated between the vertical and horizontal positions.

A method for inserting an optical fiber tray 180a into the tray carrier 131 includes inserting a pivot pin 162a of the optical fiber tray 180a into an entrance 142a of a socket 140a in the tray carrier. A force is applied on the optical fiber tray 180a, using the tray as a lever and a first (upper) protrusion 152a on the tray carrier 131 as a fulcrum of the lever. The optical fiber tray 180a is rotated till the pivot pin 162 moves from the entrance 142a to a sleeve portion 144a of the socket 140a. The rotating is stopped when a hinge portion 160a that includes the pivot pin 162a contacts a second (lower) protrusion 152b on the tray carrier 131. A detent 156b is also engaged when the hinge portion 160a contacts the second protrusion 152b on the tray carrier 131.

Once the pivot pin 162a is in the sleeve 144a, the user can rotate the tray 180a in a counter-clockwise direction (opposite the clockwise direction of rotation during insertion.) The counter-clockwise rotation is stopped when a hinge portion 160a that includes the pivot pin 162a contacts the first protrusion 152a. A detent 156a is also engaged when the hinge portion 160a contacts the first protrusion 152a.

A method for providing access to one of the optical fiber trays 180a–180h includes providing a tray carrier 131 having a plurality of fiber optic trays 180a–180h pivotally attached thereto, the trays 180a–180h being stackable adjacent to each other and parallel to each other. A first one of the trays 180b–180h that is to be accessed is selected. The selected tray and any tray(s) below the selected fiber optic tray are rotated to a (horizontal in FIG. 1A) detent position. The selected tray (and any tray below it) remain(s) in the detent position without attaching any additional retaining device thereto.

When work on the selected fiber tray is completed, the selected tray and any trays below the selected tray are rotated back to a first (vertical in FIG. 1A) detent position. The first detent position is the position in which the trays 180a–180h are stackable adjacent to each other and parallel to each other. The cover 122 is then attached to the base plate 120 of the pedestal 110, so that the plurality of trays 180a–180h are stacked in parallel inside the fiber optic enclosure 102.

A high density fiber optical pedestal 100 according to the invention may be implemented using any tray carrier capable of supporting the fiber splice trays 180a–180h in either the first (vertical) position for storage or in a second (horizontal) position to access one of the trays for performing a fiber splice or termination. The description above focuses on a preferred embodiment, but other tray carriers may also be used. For example, a conventional tray carrier lacking the detents and stops of the exemplary tray carrier may be used, so long as another means of supporting the trays in the desired position (e.g., a locking clip or bracket) is used.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A system for organizing optical fibers, comprising:
    a pedestal having a longitudinal passage therethrough, the pedestal having at least one hole on a side surface thereof, the hole penetrating from the longitudinal passage to an exterior of the pedestal;
    at least one bracket mounted to the pedestal near the hole, the bracket is shaped to receive and store a plurality of fiber splice trays; and
    at least one fiber splice tray mounted on the bracket.

2. The system of claim 1, wherein the at least one hole includes a plurality of holes located around a perimeter of the pedestal.

3. The system of claim 2, wherein the at least one bracket includes a plurality of brackets located between respective ones of the plurality of holes.

4. The system of claim 3, wherein the pedestal includes at least three holes, and the system includes at least three brackets mounted between respective ones of the at least three holes.

5. The system of claim 3, further comprising:
    a single base mounted on the pedestal below the plurality of holes, at a distance from the bottom of the pedestal; and
    a single cover that joins with the base to form a sealed enclosure around the plurality of brackets and the at least one fiber splice tray.

6. The system of claim 1, wherein the at least one bracket has a plurality of fiber splice trays stored thereon.

7. The system of claim 1, wherein the at least one bracket holds the at least one fiber splice tray in either a vertical position for storage or in a horizontal position for accessing a fiber on the tray.

8. The system of claim 1, wherein:
    the at least one hole includes:
        at least one lower hole at a first height, and
        at least one upper hole at a second height above the first height;
    and the at least one bracket includes:
        at least one lower bracket near the lower hole, and
        at least one upper bracket near the upper hole.

9. The system of claim 8, wherein:
    the at least one hole includes:
        a first plurality of lower holes located around the perimeter of the pedestal at the first height, and
        a plurality of upper holes located around the perimeter of the pedestal at the second height; and
    the at least one bracket includes:
        a plurality of lower brackets located between respective ones of the lower holes, and
        a plurality of upper brackets located between respective ones of the upper holes.

10. The system of claim 8, wherein:
    the second height is separated from the first height by a distance that is at least large enough to simultaneously accommodate a lower splice tray stored in a vertical position in the lower bracket and an upper splice tray positioned in a horizontal position in the upper bracket.

11. A method of organizing fiber trays, comprising the steps of:
    (a) mounting a first plurality of brackets around a perimeter of a pedestal, the pedestal having a first plurality of holes located around the perimeter, the first plurality of brackets being mounted between respective ones of the first plurality of holes; and
    (b) mounting a first plurality of fiber trays on the first plurality of brackets.

12. The method of claim 11, wherein step (b) includes mounting at least two of the fiber trays on at least one of the first plurality of brackets.

13. The method of claim 11, further comprising:
    (c) mounting a second plurality of brackets around the perimeter of the pedestal, the pedestal having a second plurality of holes located around the perimeter above the first plurality of holes, the second plurality of brackets being mounted between respective ones of the second plurality of holes; and
    (d) mounting a second plurality of fiber trays on the second plurality of brackets.

14. A method for organizing fibers, comprising the steps of:
    (a) running a plurality of fibers through a longitudinal passage within a pedestal;
    (b) passing a first one of the plurality of fibers through a first hole in a side of the pedestal;

(c) passing a second one of the plurality of fibers through one of the group consisting of the first hole and a second hole in the side of the pedestal; and (d) forming a splice between the first fiber and the second fiber on a first fiber tray coupled to the pedestal.

15. The method of claim 14, wherein step (c) includes passing the second fiber through the second hole in the pedestal.

16. The method of claim 14, wherein:

step (b) includes passing each pair of fibers, within the plurality of fibers that are to be spliced, through a respective pair of successive holes in the pedestal, said holes in each pair of successive holes having a respective fiber tray therebetween for splicing the respective pair of fibers.

17. The method of claim 14, wherein the pedestal has a second fiber tray and a third hole at positions along the perimeter of the pedestal different from the positions of the first fiber tray and first and second holes, respectively, with the first hole positioned between the first and second fiber trays, and the second fiber tray between the first and third holes, the method further comprising the steps of:

passing a third one of the plurality of fibers through the first hole;

passing a fourth one of the plurality of fibers through the third hole; and forming a splice between the third fiber and the fourth fiber on the second fiber tray.

18. The method of claim 14, wherein the pedestal has a plurality of holes and a plurality of brackets alternately spaced around the perimeter of the pedestal, each of the plurality of brackets having at least one fiber tray pivotally mounted thereon, the method including the steps of:

passing a pair fibers from the passage of the pedestal to the exterior via any pair of successive holes in the pedestal; and forming a splice between the pair of fibers on the respective one of the fiber trays positioned between the pair of holes.

19. The method of claim 18, further comprising pivoting the tray having the splice to a vertical position for storage after forming the splice.

* * * * *